(12) United States Patent
Zhou

(10) Patent No.: US 10,660,145 B2
(45) Date of Patent: May 19, 2020

(54) METHOD AND DEVICE FOR INDICATING NETWORK MODE

(71) Applicant: BAICELLS TECHNOLOGIES CO. LTD., Beijing (CN)

(72) Inventor: Mingyu Zhou, Beijing (CN)

(73) Assignee: BAICELLS TECHNOLOGIES CO. LTD., Beijing (CN)

(*) Notice: Subject to any disclaimer, the term of this patent is extended or adjusted under 35 U.S.C. 154(b) by 0 days.

(21) Appl. No.: 16/109,025

(22) Filed: Aug. 22, 2018

(65) Prior Publication Data

US 2018/0368209 A1 Dec. 20, 2018

Related U.S. Application Data

(63) Continuation of application No. PCT/CN2017/071385, filed on Jan. 17, 2017.

(30) Foreign Application Priority Data

Feb. 26, 2016 (CN) .......................... 2016 1 0109826

(51) Int. Cl.
*H04W 48/10* (2009.01)
*H04W 48/12* (2009.01)
(Continued)

(52) U.S. Cl.
CPC ............ *H04W 76/11* (2018.02); *H04W 48/10* (2013.01); *H04W 48/12* (2013.01); *H04W 48/18* (2013.01);
(Continued)

(58) Field of Classification Search
CPC ..... H04W 4/12; H04W 4/18; H04W 8/18–30; H04W 24/02; H04W 48/02–20;
(Continued)

(56) References Cited

U.S. PATENT DOCUMENTS

| 2008/0253399 A1* | 10/2008 | Wang | H04W 28/06 370/477 |
| 2010/0099412 A1* | 4/2010 | Ramachandran | H04W 48/18 455/435.2 |

(Continued)

FOREIGN PATENT DOCUMENTS

| CN | 101951415 A | 1/2011 |
| CN | 103004252 A | 3/2013 |
| CN | 104507114 A | 4/2015 |

OTHER PUBLICATIONS

International Search Report for International Application No. PCT/CN2017/071385, dated Apr. 10, 2017.

*Primary Examiner* — Timothy J Weidner
(74) *Attorney, Agent, or Firm* — Marshall, Gerstein & Borun LLP

(57) ABSTRACT

The present disclosure discloses a method and device for indicating a network mode. The method comprises detecting a format of a value of a Public Land Mobile Network IDentity (PLMN-ID) in a system information block; and determining, when the value of the PLMN-ID is a value indicated according to a first preset format, the indicated value as information indicating that a network mode is a Neutral Host (NH) mode, wherein the first preset format is a format different from a second preset format which is a format of the PLMN-ID in an Evolved Packet Core (EPC) connected mode. The present disclosure solves the technical problem of the increase in protocol complexity caused by different message formats since the EPC connected network mode and the NH network mode use the IDs of completely different types and numbers.

10 Claims, 3 Drawing Sheets

Detecting a format of a value of a PLMN-ID in a system information block — S102

When the value of the PLMN-ID is a value indicated according to a first preset format, determining the indicated value as information for indicating that the network mode is an NH mode — S104

(51) Int. Cl.
*H04W 48/18* (2009.01)
*H04W 76/10* (2018.01)
*H04W 76/11* (2018.01)
*H04W 84/04* (2009.01)
*H04W 88/06* (2009.01)
*H04W 88/16* (2009.01)
*H04W 92/10* (2009.01)

(52) U.S. Cl.
CPC .......... *H04W 76/10* (2018.02); *H04W 84/042* (2013.01); *H04W 88/06* (2013.01); *H04W 88/16* (2013.01); *H04W 92/10* (2013.01)

(58) Field of Classification Search
CPC ............. H04W 72/04; H04W 72/0406; H04W 72/042; H04W 72/12; H04W 72/1278; H04W 72/1289–14; H04W 74/002; H04W 74/006; H04W 76/10–19; H04W 84/02; H04W 84/04–047; H04W 88/02; H04W 88/06; H04W 88/08; H04W 88/10; H04W 88/16; H04W 92/04; H04W 92/10
See application file for complete search history.

(56) References Cited

U.S. PATENT DOCUMENTS

| | | | |
|---|---|---|---|
| 2010/0105380 A1* | 4/2010 | Attar ..................... | H04W 48/16 455/434 |
| 2015/0119029 A1* | 4/2015 | Scribano ............... | H04W 48/18 455/434 |
| 2016/0100331 A1* | 4/2016 | Ahmavaara ........... | H04W 28/08 370/236 |

\* cited by examiner

METHOD AND DEVICE FOR INDICATING NETWORK MODE

CROSS-REFERENCE TO RELATED APPLICATIONS

The present application is a Continuation based on International Application No. PCT/CN2017/071385 filed on Jan. 17, 2017, which claims priority to Chinese Patent Application No. 201610109826.0, filed on Feb. 26, 2016, the contents of each of which are incorporated herein by reference in their entirety.

TECHNICAL FIELD

The present disclosure relates to the field of communication and in particular to a method and device for indicating a network mode.

BACKGROUND

The mobile communication system refers to a system in which a service provider provides communication services for a user terminal (such as a mobile phone) by deploying a wireless access network device (such as a base station) and a core network device (such as a Home Location Register (HLR)). The mobile communication has experienced the first generation, the second generation, the third generation, and the fourth generation. The first generation mobile communication refers to the original analog and voice call-only cellular phone standards, and mainly adopts an analog technology and a Frequency Division Multiple Access (FDMA) access method. The second generation mobile communication introduces a digital technology, improves network capacity, improves voice quality and confidentiality, and is represented by "Global System for Mobile Communication (GSM)" and "Code Division Multiple Access (CDMA) IS-95. The third generation mobile communication mainly refers to the CDMA2000 technology, the WCDMA technology and the TD-SCDMA technology, which all use CDMA as an access technology. The fourth generation mobile communication system is relatively and internationally unified in standard and is long term evolution/long term evolution-advanced (LTE/LTE-A) developed by the international organization for standardization 3GPP, the downlink of which is based on the access way of Orthogonal Frequency Division Multiple Access (OFDMA), and the uplink of which is based on the access way of Single Carrier-Frequency Division Multiple Access (SC-FDMA). According to the flexible bandwidth and the self-adaptive modulation and coding manner, the high-speed transmission with a downlink peak rate of 1 Gbps and an uplink peak rate of 500 Mbps is achieved.

MuLTEfire is the LTE technology formed by newly defining an uplink transmission method based on the LTE R13 LAA downlink transmission method, and can independently work in an unlicensed frequency band, that is, stand-alone LTE-U. The MuLTEfire (abbreviated as MF) supports two network modes (or network services), which are an Evolved Packet Core (EPC) connected mode (as shown in FIG. 1) and a Neutral Host (abbreviated as NH) mode. The network architecture is as shown in FIG. 2. The MF network can also support the two network modes at the same time.

For the UE, after accessing the MF network, it is necessary to firstly identify the network mode and obtain the public land mobile network identity (PLMN-ID) and/or the MF network ID and the service provider ID according to the corresponding network mode, while in the conventional LTE network, the operator ID is informed by broadcasting a PLMN-ID List through SIB1.

For the EPC connected mode, the PLMN-ID in the existing LTE is used. The existing PLMN-ID can represent 6 decimal numbers with 24 bits, and every 4 bits correspond to one decimal number. The first 12 bits are used to represent the Mobile Country Code (MCC) of 3 decimal numbers. Te last 12 bits are used to represent the Mobile Network Code (MNC) of the 3 decimal numbers or the first 8 bits of the last 12 bits are used to represent the MNC of 2 decimal numbers, as shown in FIG. 3.

Some new IDs are specifically defined for the NH mode, including: an MF-ID for the MF network identity, a PSP-ID for the service provider identity, and an MFGPLMN-ID for the MF unified identity of the NH mode, which uses the value specially reserved for the MF in PLMN-ID fields. For the MF-ID, the same MF network has only one MF-ID for indicating the network, and the MF-ID contains a globally unique MF-ID and a randomly-selected MF-ID. For the MF network using the randomly-selected MF-ID, the MF-ID can be randomly-selected by the MF network. Therefore, the collision probability that different MF networks select the same MF-ID depends on the selection length of the MF-ID and the number of the MF networks. For the PSP-ID, one MF network can broadcast multiple PSP-IDs for supporting multiple service providers to share the MF network to provide services.

However, on one hand, the UE access network needs to be able to identify the supported network mode according to a network broadcast message. However, since the EPC connected network mode and the NH network mode use the IDs of completely different types and numbers, different formats of the message (such as SIB1 or eSIB or SIBx) are caused, which further results in the increase of protocol complexity.

On the other hand, for the MF network of the NH mode, the use of a shorter randomly-selected MF-ID length will lead to the larger collision probability when the number of the MF networks is larger. As a result, the UE selects the wrong MF network. While if the longer MF-ID is used, a greater system overhead will be caused, and the spectrum efficiency is reduced.

At present, there is no effective solution to the above problems yet.

SUMMARY

The embodiments of the present disclosure provide a method and device for indicating a network mode, aiming to at least solve the technical problem of the increase in protocol complexity caused by different message formats since the EPC connected network mode and the NH network mode use the IDs of completely different types and numbers.

According to one aspect of the present disclosure, there is provided a method for indicating a network mode. The method includes: detecting a format of a value of a Public Land Mobile Network IDentity (PLMN-ID) in a system information block; and determining, when the value of the PLMN-ID is a value indicated according to a first preset format, the indicated value as information indicating that the network mode is a Neutral Host (NH) mode, wherein the first preset format is a format different from a second preset format which is a format of the PLMN-ID in an Evolved Packet Core (EPC) connected mode.

Further, the method further includes, after detecting the format of the value of the PLMN-ID in the system information block: determining, when the value of the PLMN-ID is a value indicated according to the second preset format, the indicated value as information indicating that the network mode is the EPC connected mode.

Further, when the network mode indicated in the system information block is one network mode: when the indicated value is determined as the information indicating that the network mode is the EPC connected mode, a field corresponding to the PLMN-ID is indicated according to the second preset format, wherein in the second preset format, the PLMN-ID comprises a field representing a Mobile Country Code (MCC) followed by a field representing a Mobile Network Code (MNC).

Further, when the network mode indicated in the system information block is one network mode: when the indicated value is determined as the information indicating that the network mode is the NH mode, a field corresponding to the PLMN-ID is indicated according to the first preset format, wherein in the first preset format, the PLMN-ID comprises sequentially a field representing a network unified identity of the NH mode, a field representing a network identity of the NH mode, and a field representing a service provider identity.

Further, when the network mode indicated in the system information block comprises two network modes: a part of fields in a PLMN-ID List is used to indicate an identity in the EPC connected mode, and the remaining fields are used to indicate the identity in the NH mode, with a preset delimiting ID therebetween as a delimiter.

Further, one or more unused values of the PLMN-ID from a range of values indicated according to the second preset format are assigned as a value of the network unified identity of the NH mode.

Further, one or more values outside a range of values indicated according to the second preset format are selected as a value of the network unified identity of the NH mode.

Further, when the network mode indicated in the system information block is one network mode: a first PLMN-ID field of the PLMN-ID List in the system information block is used to indicate the network mode, wherein when the first PLMN-ID field is a value indicated according to the second preset format, the indicated value is determined as the information indicating that the network mode is the EPC connected mode.

Further, when the network mode indicated in the system information block is one network mode: when the first PLMN-ID field is a value of the network unified identity of the NH mode, the value is determined as the information indicating that the network mode is the NH mode.

Further, when the system information block indicates two network modes, in which the PLMN-ID List comprises m1 PLMN-ID fields, values of the first n1 PLMN-ID fields are the values indicated according to the second preset format and used to indicate the PLMN-ID in the EPC connected mode, where n1+2 is smaller than or equal to m1. The (n1+1)th PLMN-ID field is used to transmit the network unified identity of the NH mode (MFGPLMN-ID) as the preset delimiting ID. The (n1+2)th to (m1)th PLMN-ID fields are used to indicate the network identity of the NH mode (MF-ID) and multiple short-format service provider identities (PSP-IDs).

Further, when the system information block indicates one network mode: the first PLMN-ID field of the PLMN-ID List in the system information block is used to indicate the network mode. When the first PLMN-ID field is the value indicated according to the second preset format, the indicated value is determined as the information for indicating that the network mode is the EPC connected mode.

Further, when the system information block indicates one network mode: when the first PLMN-ID field is the value of the network unified identity of the NH mode of the NH mode (MFGPLMN-ID), the value is determined as information for indicating that the network mode is the NH mode.

Further, when the network mode indicated in the system information block comprises two network modes: the PLMN-ID List comprises m2 PLMN-ID fields: values of the first n2 PLMN-ID fields are the values indicated according to the second preset format and used to indicate the PLMN-ID in the EPC connected mode, where n2+2 is smaller than or equal to m2. The (n2+1)th PLMN-ID field is used to transmit the network identity of the NH mode (MF-ID) as the preset delimiting ID. The (n2+2)th to (m2)th PLMN-ID fields are used to indicate the multiple short-format service provider identities in the NH mode (PSP-IDs).

Further, when the system information block indicates one network mode: the first i bits in the Nth PLMN-ID field in the PLMN-ID List in the system information block are used to indicate the network mode, where when the first i bits are in a first preset value range, the system information block is determined as the information for indicating that the network mode is the EPC connected mode.

Further, when the system information block indicates one network mode: when the first i bits in the Nth PLMN-ID field in the PLMN-ID List in the system information block are in a second preset value range, the system information block is determined as a value for indicating that the network mode is the NH mode.

Further, when the network mode indicated in the system information block comprises two network modes: the PLMN-ID List comprises m3 PLMN-ID fields: values of the first n3 PLMN-ID fields are the values indicated according to the second preset format and used to indicate the PLMN-ID in the EPC connected mode, where n3+2 is smaller than or equal to m3. The first i bits in the (n3+1)th PLMN-ID field are used to indicate the preset delimiting ID when in the second preset value range. The remaining bits in the (n3+1)th PLMN-ID field are used to transmit the network identity of the NH mode (MF-ID). The (n3+2)th to (m3)th PLMN-ID fields are used to indicate multiple short-format service provider identities in the NH mode (PSP-IDs).

Further, the method further comprises indicating system information blocks of different network modes by physical layer parameters.

Further, the method further comprises assigning a preset bit as an indicator indicating the network identity of the NH mode (MF-ID), so as to support the use of the network identities of the NH mode of different lengths of the NH mode in different scenarios.

According to another aspect of the embodiment of the present disclosure, there is further provided a device for indicating a network mode. The device includes: a detecting unit configured to detect a format of a value of a Public Land Mobile Network Identity (PLMN-ID) in a system information block; and a determining unit configured to, determine when the value of the PLMN-ID is a value indicated according to a first preset format, the indicated value as information indicating that the network mode is a Neutral Host (NH) mode, wherein the first preset format is a format different from a second preset format which is a format of the PLMN-ID in an Evolved Packet Core (EPC) connected mode.

The embodiment of the present disclosure further provides a non-transient computer readable storage medium. The non-transient computer readable storage medium stores computer instructions configured to enable a computer to perform the foregoing method for indicating a network mode of the present disclosure.

The embodiment of the present disclosure further provides a computer program product. The computer program product comprises a computer program that is stored on a non-transient computer readable storage medium. The computer program comprises program instructions which, when executed by a computer, cause the computer to perform the forgoing method for indicating a network mode of the present disclosure.

The embodiment of the present disclosure further provides an electronic device. The electronic device comprises at least one processor and a memory communicatively connected with the at least one processor. The memory stores instructions executable by the at least one processor and configured to perform the forgoing method for indicating a network mode of the present disclosure.

The method for indicating a network mode by the PLMN-ID according to the embodiment of the present disclosure supports the ID types corresponding to two different network modes under the premise of ensuring the same size of the system information block, thereby reducing the standard complexity and solving the technical problem of the increase in protocol complexity caused by different message formats since the EPC connected network mode and the NH network mode use the IDs of completely different types and numbers.

BRIEF DESCRIPTION OF THE DRAWINGS

The accompanying drawings described herein are provided for a further understanding of the present disclosure, and constitute part of the present disclosure. The illustrative embodiments of the present disclosure and the description thereof are for explaining the present disclosure and do not constitute an undue limitation to the present disclosure. In the drawings.

DESCRIPTION OF EMBODIMENTS

Figure 1:
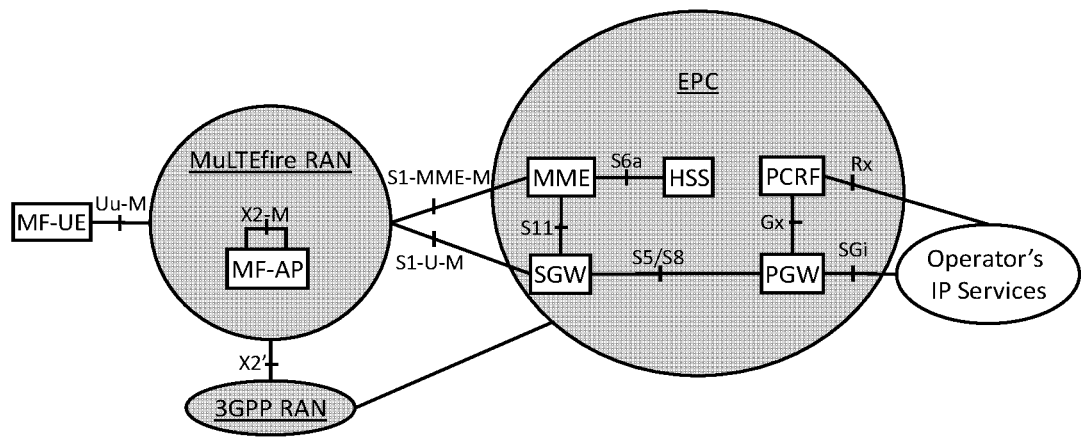
FIG. 1 is a network architecture view of an EPC connected mode according to the related art.
Figure 2:
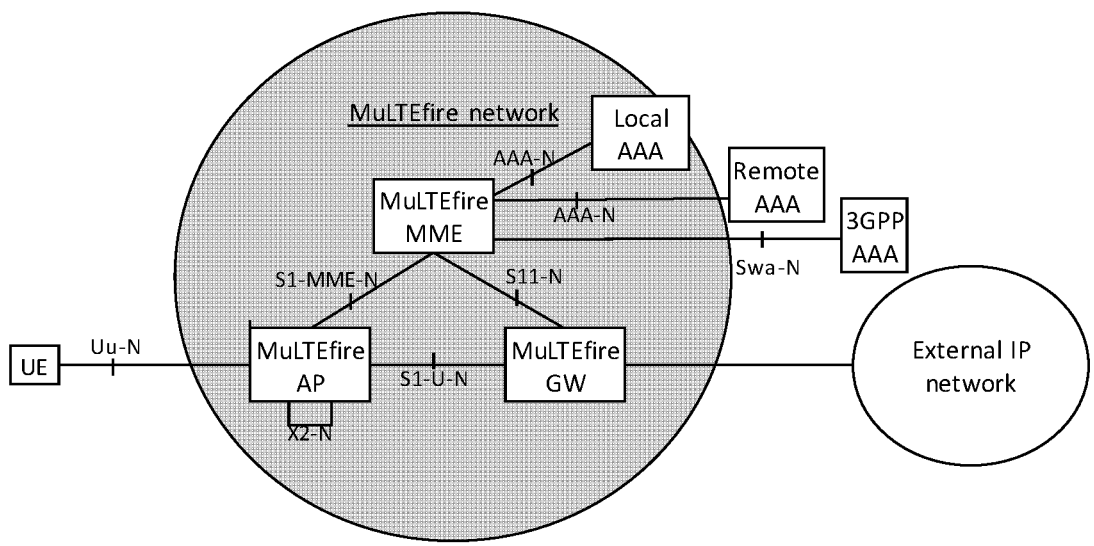
FIG. 2 is a network architecture view of an NH mode according to the related art.
Figure 3:
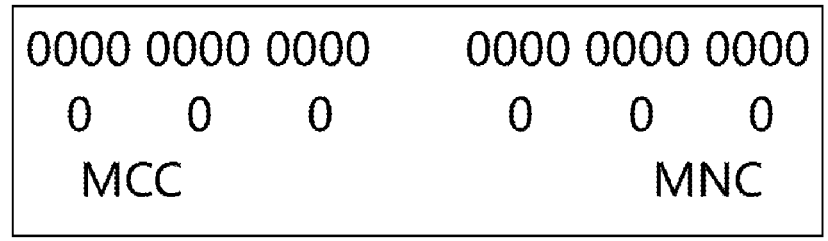
FIG. 3 is a schematic view of a PLMN-ID according to the related art.

In order to make those skilled in the art better understand the solution of the present disclosure, the technical solutions in the embodiments of the present disclosure are clearly and completely described in the following with reference to the accompanying drawings in the embodiments of the present disclosure. It is apparent that the described embodiments are only part of the embodiments of the present disclosure, but not all of them. All other embodiments obtained by those of ordinary skill in the art based on the embodiments of the present disclosure without any creative effort shall fall within the scope of protection of the present disclosure.

It should be noted that the terms "first", "second" and the like in the description and claims, as well as the above-mentioned drawings, of the present disclosure are used to distinguish similar objects, but not necessarily used to describe a specific order or precedence order. It should be understood that data used in this way can be interchanged where appropriate so that the embodiments of the present disclosure described herein can be implemented in a sequence other than those illustrated or described herein. The terms "including" and "having" and any variants thereof are intended to cover non-exclusive inclusions. For example, a process, method, system, product, or device that comprises a series of steps or units is not necessarily limited to those steps or units that are clearly listed, but may comprise other steps or units that are not clearly listed or are inherent to such processes, methods, products, or devices.

Before the embodiments of the present disclosure are described, the term names involved in the embodiments of the present disclosure are as shown in table 1 specifically.

TABLE 1

| English terms | Full name | Chinese terms |
|---|---|---|
| AP | Access Point | 接入点 |
| BOSS | Business & Operation Support System | 业务运营支撑系统 |
| BSR | Buffer Status Report | 缓存状态报告 |
| CA | Carrier Aggregation | 载波聚合 |
| CCA | Clear Channel Assessment | |
| CDMA2000 | Code Division Multiple Access 2000 | 码分多址 |
| CSAT | Carrier Sense Adaptive Transmission | 载波侦听自适应传输 |
| DC | Dual Connectivity | |
| DFS | Dynamic Frequency Selection | 动态频率选择 |
| EPC | Evolved Packet Core network | 演进的分组核心网 |
| GSM | Global System for Mobile Communication | 全球移动通信系统 |
| LAA | Licensed-Assisted Access | |
| LAN | Local Area Network | 局域网 |
| LBT | Listen Before Talk | 先听后发 |
| LIPA | Local IP Access | 本地 IP 接入 |
| LC | Logic Channel | 逻辑信道 |
| LCG | Logic Channel Group | 逻辑信道组 |
| LTE | Long Term Evolution | 长期演进 |
| LTE-A | Long Term Evolution-Advance | 增强的长期演进 |
| LTE-U | Long Term Evolution in unlicensed spectrum | |
| ID | Identity | 标识 |
| IP | Internet Protocol | 互联网协议 |
| ISP | Internet Service Provider | 互联网服务商 |
| MAC | Media Access Control | 媒体接入控制 |
| MeNB | Master eNB | |
| MME | Mobility Management Entity | 移动管理模块 |
| NATNAT | Network Address Translation | 网络地址转换 |
| PCell | Primary Cell | |
| PCRF | Policy & Charging Rules Function | 策略与计费规则功能单元 |
| PDCP | Packet Data Convergence Protocol | 分组数据汇聚协议 |
| PDN | Packet Data Network | 分组数据网 |
| PHY | PHYsical layer | 物理层 |
| P-GW | PDN Gateway | PDN 网关 |
| QoS | Quality of Service | 服务质量 |
| RLC | Radio Link Control | 无线链路控制 |
| RRC | Radio Resource Control | 无线资源控制 |
| RSRP | Reference Signal Received Power | 参考信号接收功率 |
| RSRQ | Reference Signal Received Quality | 参考信号接收质量 |
| SIPTO | Selected IP Traffic Offloading | 选择性 IP 流量卸载 |
| SCell | Serving Cell | |
| SeNB | Secondary eNB | |
| SSID | Service Set IDentifier | 服务集标识 |
| S-GW | Serving Gateway | 服务网关 |
| TD-SCDMA | Time Division-Synchronous CDMA | 时分的同步 CDMA |
| UE | User Equipment | 用户终端 |
| USB | Universal Serial Bus | 通用串行总线 |
| VPN | Virtual Private Network | 虚拟专用网 |
| WAN | Wide Area Network | 广域网 |
| WCDMA | Wideband CDMA | 宽带 |

It should be noted that the specific mobile communication technologies described in the embodiments of the present disclosure can be, but not limited to, WCDMA, CDMA2000, TD-SCDMA, WiMAX, LTE/LTE-A, LAA, MuLTEfire, the fifth generation, the sixth generation or th Nth generation mobile communication technologies that may occur successively.

The terminal described in the embodiments of the present disclosure refers to a terminal side product that can support the communication protocol of a land mobile communication system, and particularly refers to a modem module (Wireless Modem) that can be integrated by various types of terminal forms such as a mobile phone, a tablet computer and a data card, to complete the communication function.

For the convenience of description, the fourth generation mobile communication system LTE/LTE-A and the MuLTEfire derived therefrom are taken as an example, wherein the mobile communication terminal is represented as UE (User Equipment), and the access device is represented as a base station eNB or an access point (AP).

According to the embodiment of the present disclosure, there is provided a method for indicating a network mode. It should be noted that the steps shown in the flowchart of the accompanying drawings can be performed in, for example, a computer system of a group of computer executable instructions. Besides, although a logical sequence is shown in the flowchart, in some cases, the steps shown or described can be performed in an order different from that described herein.

Figure 4:
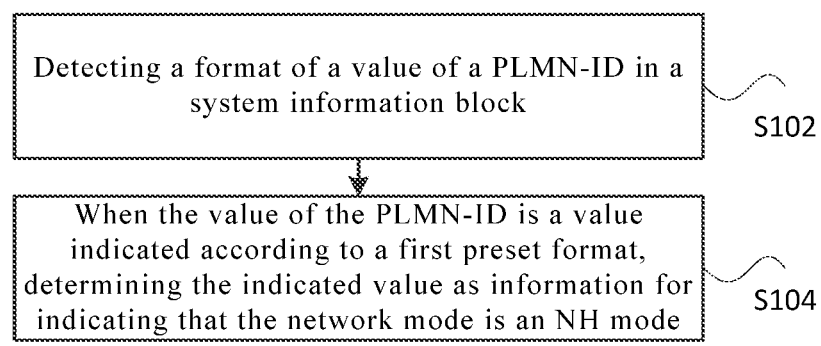
FIG. 4 is a flow chart of a method for indicating a network mode according to an embodiment of the present disclosure.

FIG. 4 is a flowchart of a method for indicating a network mode according to the embodiment of the present disclosure. As shown in FIG. 4, the method comprises the following steps.

Step S102, a format of a value of a PLMN-ID in a system information block is detected.

Step S104, when the value of the PLMN-ID is a value indicated according to a first preset format, the indicated value is determined as information for indicating that the network mode is an NH mode, wherein the first preset format is a format different from a second preset format, and the second preset format is a format of the PLMN-ID in an EPC connected mode. The number of bits occupied by the value indicated according to the second preset format is the same as the number of bits occupied by the value indicated according to the first preset format.

After detecting the format of the value of the PLMN-ID in the system information block, the method further comprises when the value of the PLMN-ID is a value indicated according to the second preset format, determining the indicated value as information for indicating that the network mode is the EPC connected mode.

In the embodiment of the present disclosure, the network mode is determined by detecting whether the value of the PLMN-ID is the value of the conventional PLMN-ID, that is, detecting whether the value of the PLMN-ID is the value indicated according to the first preset format or the second preset format. The second preset format is the value of the conventional PLMN-ID, and the first preset format is the value of the unconventional PLMN-ID.

Specifically, the network mode can be determined according to whether the value of the PLMN-ID in the system information block is the value of the conventional PLMN-ID. That is, when the value of the PLMN-ID is the conventional PLMN-ID, the network mode is the EPC connected mode, and when the value of the PLMN-ID is the unconventional PLMN-ID, the network mode is the NH mode.

According to the embodiment of the present disclosure, under the premise of ensuring the same size of the system information block, the method for indicating a network mode by using the PLMN-ID can support ID types indicating two different network modes, thereby reducing the standard complexity. The technical problem of the increase in protocol complexity caused by different message formats since the EPC connected network mode and the NH network mode use the IDs of completely different types and numbers can be solved.

Preferably, when the network mode indicated in the system information block is one network mode: on one hand, when the indicated value is determined as the information for indicating that the network mode is the EPC connected mode, the field corresponding to the PLMN-ID is indicated according to the second preset format. In the second preset format, the PLMN-ID comprises a field representing an MCC followed by a field representing an MNC. That is, in the EPC connected mode, the indicating is performed according to the conventional PLMN-ID format.

When the network mode indicated in the system information block is one network mode: on the other hand, when the indicated value is determined as the information for indicating that the network mode is the NH mode, the field corresponding to the PLMN-ID is indicated according to the first preset format. In the first preset format, the PLMN-ID comprises sequentially a field representing a network unified identity of the NH mode (MFGPLMN-ID), a field representing a network identity of the NH mode (MF-ID), and a field representing a service provider identity (PSP-ID).

Specifically, when only one mode is indicated in the system information block, in the EPC connected mode, a filed corresponding to an ID is indicated according to the existing PLMN-ID format.

In the NH mode, a field corresponding to an ID is indicated according to the MFGPLMN-ID/MF-ID/PSP-ID format.

When the network mode indicated in the system information block comprises two network modes: a part of the fields in a PLMN-ID List are used to indicate the ID in the EPC connected mode, and the remaining fields are used to indicate the ID in the NH mode, with a preset delimiting ID therebetween as a delimiter.

Specifically, the PLMN-ID, i.e., the preset delimiting identifier, which is a special value, can be used as a delimiter. A part of the fields corresponding to IDs are used to indicate the PLMN-ID in the EPC-connected mode, and the remaining part of the fields indicate the MFGPLMN-ID/MF-ID/PSP-ID in the NH mode.

Preferably, one or more unused values of the PLMN-ID from a value range of a value indicated according to the second preset format are assigned as the value of the MFGPLAN-ID of the NH mode.

That is, by assigning a dedicated PLMN-ID as the MFGPLMN-ID, a special PLMN-ID is assigned from the value range of the conventional PLMN-ID as the unified identity of the MF network in the NH mode (i.e., MFGPLMN-ID).

For example, the conventional PLMN-ID occupies 24 bits, and the value range of every 4 bits is from 0000 to 1001 to represent a decimal number. Therefore, the value range of the PLMN-ID is a 6-bit or 5-bit (the first 20 bits are used to represent the PLMN-ID, and the values of the last 4 bits are set to 1111) decimal number, i.e., from 000000 to 999999 or from 00000 to 99999. Therefore, an existing unused value of the PLMN-ID in the value range of 000000 to 99999 (represented as a 6-bit decimal number) or 00000 to 99999 (represented as a 5-bit decimal number) is assigned to the MFGPLMN-ID as the value of MFGPLMN-ID. The MCC in the conventional PLMN-ID is assigned by the ITU, and the MNC is assigned inside each country. From the perspective of reducing the coordinated workload with each country, it is more reasonable to adopt the unused MCC assigned by the ITU, and the value of the MNC can be selected by default or by the MuLTEfire Alliance. For example, 999000 (the corresponding binary numbers are 1001 1001 1001 0000 0000 0000) or 99900 (the corresponding binary numbers are 1001 1001 1001 0000 0000 1111) is the MFGPLMN-ID, etc. When the existing PLMN-ID is assigned to the MCC of the international mobile shared number (the value is 901), it is also possible to apply for the value of the unused MNC as the MFGPLMN-ID, for example, the decimal number 90160 (a binary number 1001 0000 0001 0110 0000 1111).

Optionally, the value outside the value range of the values indicated according to the second preset format can be selected as the value of the MFGPLMN-ID of the NH mode.

In the present embodiment, the value outside the value range of the conventional PLMN-ID is assigned as the MFGPLMN-ID.

For example, 24 bits are assigned to the values outside the value range used by the conventional PLMN-ID, and are assigned to the MF network as the MFGPLMN-ID. The values of the 24 bits do not comprise that 1, the PLMN-ID corresponds to all the values of the 6 decimal numbers, that is, all 6 groups of 4 bits have a value range of 0000 to 1001; and 2, the PLMN-ID corresponds to all the values of the 5 decimal numbers, that is, the value range of the first 5 groups of 4 bits is 0000 to 1001, and the value of the sixth group of 4 bits is 1111. One or more of the values outside the value range of the conventional PLMN-ID are selected as the MFGPLMN-ID, for example [1111 1111 1111 1111 1111 1111].

Preferably, when the network mode indicated in the system information block is one network mode: on one hand, the first PLMN-ID field of the PLMN-ID List in the system information block is used to indicate a network mode. When the first PLMN-ID field is a value indicated according to the second preset format, the indicated value is determined as the information for indicating that the network mode is the EPC connected mode, while the above first PLMN-ID field indicates one PLMN-ID.

When the network mode indicated in the system information block is one network mode: on the other hand, when the first PLMN-ID field is the value of the MFGPLMN-ID of the NH mode, the indicated value is determined as the information for indicating that the network mode is the NH mode.

According to the embodiment of the present disclosure, the method for valuing the MFGPLMN-ID based on the above embodiment indicates the network mode by transmitting the MFGPLMN-ID in the system information block or not. The system information block can be SIB1, eSIB, or SIBx, etc.

Specifically, when only one network mode is in the system information block, taking the SIB1 as an example, the first 24 bits in the original PLMN-ID List field (i.e., the first PLMN-ID) can be used to indicate the network mode. Specifically, when the first 24 bits are the value of the conventional PLMN-ID, the network mode is the EPC connected mode. All the fields in the PLMN-ID List are the PLMN-ID, that is, the existing PLMN-ID List.

When the first 24 bits are the value of the MFGPLMN-ID, the network mode is the NH mode. The subsequent bits in the PLMN-ID List are used to indicate the MF-ID and the PSP-ID.

For example, when the PLMN-ID List contains 6 PLMN-IDs, there are 6*24=144 bits in total.

In the NH mode, the first group of 24-bits is used to indicate the MFGPLMN-ID.

The second group of 24-bits is used to indicate the MF-ID (it is assumed that the length of the MF-ID is 24-bits).

The third to sixth groups of 24-bits are used to represent 4 short-format PSP-IDs respectively (it is assumed that the short format of the PSP-ID is 24-bits).

Preferably, when the network mode indicated in the system information block comprises two network modes, in which the PLMN-ID List comprises m1 PLMN-ID fields, values of the first n1 PLMN-ID fields are the values indicated according to the second preset format and used to indicate the PLMN-ID in the EPC connected mode, where n1+2 is smaller than or equal to m1. The (n1+1)th PLMN-ID field is used to transmit the MFGPLMN-ID of the NH mode and also serves as a network mode delimiter. The (n1+2)th to (m1)th PLMN-ID fields are used to indicate the MF-ID of the NH mode and multiple short-format PSP-IDs.

When two network modes are simultaneously indicated in one system information block, still taking the SIB1 as an example, the IDs corresponding to the two network modes can be simultaneously indicated by the original PLMN-ID List field and the MFGPLMN-ID is used as the network mode delimiter. Specifically, it is assumed that the PLMN-ID List field has a total of m1 PLMN-ID fields (i.e., m1*24-bits).

The values of the first n1 (n1+2<m1) PLMN-ID fields are the conventional PLMN-ID, and are used to indicate the conventional PLMN-ID in the EPC connected mode.

The (n1+1)th PLMN-ID field is used to transmit the MFGPLMN-ID.

The (n1+2)th to (m1)th PLMN-ID fields are used to indicate the MF-ID in the NH mode and multiple short-format PSP-IDs (it is assumed that the lengths of the MF-ID and the short-format PSP-ID are both 24-bits).

The network mode selected by the UE can be reported as follows.

When the UE selects the EPC-connected mode, the UE can report the number corresponding to the selected conventional PLMN-ID when reporting the selected-PLMN.

When the UE selects the NH mode, the UE can report the number corresponding to the MFGPLMN-ID, the number corresponding to the MF-ID, or the number corresponding to the PSP-ID when reporting the selected-PLMN.

When the network mode and the related ID are indicated by the eSIB, the SIBx or the like, the PLMN-ID and/or the MFGPLMN-ID/MF-ID/PSP-ID can be indicated by defining a new field. The method is as the above method for indicating by the PLMN-ID List in the SIB1.

Preferably, when the network mode indicated in the system information block is one network mode, on one hand, the first PLMN-ID field of the PLMN-ID List in the system information block is used to indicate the network mode. When the first PLMN-ID field is the value indicated according to the second preset format, the indicated value is determined as the information for indicating that the network mode is the EPC connected mode.

On the other hand, when the first PLMN-ID field is the value of MFGPLMN-ID of the NH mode, the indicated value is determined as the information for indicating that the network mode is the NH mode.

In the present embodiment, in the system information block, the value range corresponding to the MF-ID is set to beyond the value range of the conventional PLMN-ID or the unused values in the value range of the conventional PLMN-ID. Therefore, the MFGPLMN-ID is not needed to be broadcasted. For example, when the UE detects that the value in the PLMN-ID field goes beyond the value range of the conventional PLMN-ID, the field is considered to indicate the NH mode and the field is the MF-ID.

Taking the SIB1 as an example, when only one network mode can be indicated in the SIB1, the corresponding first group of 24-bits in the PLMN-ID List is used to indicate the network mode. Specifically, when the first 24 bits are the conventional PLMN-ID, the network mode is the EPC connected mode. All the fields in the PLMN-ID List are the PLMN-ID, that is, the existing PLMN-ID List.

When the first 24 bits are the MF-ID, the network mode is the NH mode. The subsequent bits in the PLMN-ID List are used to indicate the PSP-ID.

For example, the PLMN-ID List contains 6 PLMN-IDs, and there are 6*24=144 bits in total.

The first group of 24-bits is used to represent the MF-ID (it is assumed that the length of the MF-ID is 24-bits).

The second to sixth groups of 24-bits are used to represent different short-format PSP-IDs respectively (it is assumed that the short format of the PSP-ID is 24-bits).

Preferably, when the network mode indicated in the system information block comprises two network modes: the PLMN-ID List comprises m2 PLMN-ID fields: values of the first n2 PLMN-ID fields are the values indicated according to the second preset format, and used to indicate the PLMN-ID in the EPC connected mode, wherein n2+2 is smaller than or equal to m2. The (n2+1)th PLMN-ID field is used to transmit the MF-ID of the NH mode. The (n2+2)th to (m2)th PLMN-ID fields are used to indicate the multiple short-format PSP-IDs in the NH mode.

In the present embodiment, when two network modes are indicated, taking the SIB1 as an example, the IDs corresponding to the two network modes can be simultaneously indicated by the original PLMN-ID List field and the MF-ID can be used as the delimiter.

Specifically, it is assumed that the PLMN-ID List field has a total of m2 PLMN-ID fields (ie, m2*24-bits). The value of the first n2 PLMN-ID fields is the conventional PLMN-ID, and is used to indicate the conventional PLMN-ID in the EPC connected mode.

The (n2+1)th PLMN-ID field is used to transmit the MF-ID.

The (n2+2)th to (m2)th PLMN-ID fields are used to indicate multiple short-format PSP-IDs (it is assumed that the lengths of the MF-ID and the short-format PSP-ID are both 24-bits) in the NH mode.

The network mode selected by the UE can be reported as follows.

When the UE selects the EPC-connected mode, the UE can report the number corresponding to the selected conventional PLMN-ID when reporting the selected-PLMN.

When the UE selects the NH mode, the UE can report the number corresponding to the MF-ID or the number corresponding to the selected PSP-ID when reporting the selected-PLMN.

When the network mode and the related ID are indicated by the eSIB, the SIBx or the like, the PLMN-ID and/or the MF-ID/PSP-ID can be indicated by defining a new field. The method is as the above method for indicating by the PLMN-ID List in the SIB1.

Preferably, when the network mode indicated in the system information block is one network mode: on one hand, the first i bits in the first PLMN-ID field of the PLMN-ID List are used to indicate the network mode. When the first i bits are the value in a first preset value range, the system information block is determined as the information for indicating that the network mode is the EPC connected mode. Meanwhile, the first PLMN-ID is continued to be indicated according to the format of the conventional PLMN-ID.

On the other hand, when the first i bits are the values in a second preset value range, the system information block is determined as the information for indicating that the network mode is the NH mode.

In the present embodiment, the network mode can be indicated by a mode indication field in the system information block. A network mode indication field can be specifically added, for example, one bit is added to indicate the network mode, 0 is the NH mode, and 1 is the EPC connected mode. The value in the PLMN-ID field that exceeds the value range of the conventional PLMN-ID can also be used as the network mode field, for example, the first two bits of the PLMN-ID field. When the first two bits are the values of 00 to 10, it is indicated that the PLMN-ID field is the conventional PLMN-ID. When the first two bits are the value of 11, it is indicated that the PLMN-ID field is used to indicate the ID of the NH mode. The unused value of the PLMN-ID field can also be used as the network mode field. For example, for the first 4 bits of the PLMN-ID field, when the first two bits are the value of 0000 to 1000, it is indicated that the PLMN-ID field is the conventional PLMN-ID. When the first two bits are the value of 1001, it is indicated that the PLMN-ID field is used to indicate the ID of the NH mode.

Taking the SIB1 as an example, when only one network mode can be indicated in the SIB1, the corresponding first 2-bits in the PLMN-ID List are used to indicate the network mode. Specifically, when the first 2 bits are 00 to 10, the network mode is the EPC connected mode. All the fields in the PLMN-ID List are the PLMN-ID, that is, the existing PLMN-ID List.

When the first 2 bits are 11, the network mode is the NH mode. The subsequent bits in the PLMN-ID List are used to indicate the MF-ID and multiple PSP-IDs.

For example, the PLMN-ID List contains 6 PLMN-IDs, and there are 6*24=144 bits in total.

The first 2-bits of the first group of 24-bits are used to indicate the NH network mode.

The last 22-bits of the first group of 24-bits are used to represent the MF-ID (it is assumed that the length of the MF-ID is 22-bits).

The second to sixth groups of 24-bits are used to represent multiple short-format PSP-IDs respectively (it is assumed that the short format of the PSP-ID is 24-bits).

Preferably, when the network mode indicated in the system information block comprises two network modes, in which the PLMN-ID List comprises m3 PLMN-ID fields, values of the first n3 PLMN-ID fields are the values indicated according to the second preset format, and used to indicate the PLMN-ID in the EPC connected mode, where n3+2 is smaller than or equal to m3. The first i bits in the (n3+1)th PLMN-ID field are used to indicate the preset delimiting ID when being the values in the second preset value range. The remaining bits in the (n3+1)th PLMN-ID field are used to transmit the MF-ID of the NH mode. The (n3+2)th to (m3)th PLMN-ID fields are used to indicate multiple short-format PSP-IDs in the NH mode.

In the present embodiment, in the case of indicating two network modes, taking the SIB1 as an example, the IDs of the two network modes can be simultaneously indicated by the original PLMN-ID List field, and the network mode indication field is used as the delimiter.

Specifically, it is assumed that the PLMN-ID List field has a total of m3 PLMN-ID fields (i.e., m3*24-bits).

The value of the first n3 PLMN-ID fields is the conventional PLMN-ID, and is used to indicate the conventional PLMN-ID in the EPC connected mode.

The delimiter of the NH network mode is indicated when the first 2-bits in the (n3+1)th PLMN-ID field are equal to 11.

The last 22-bits in the (n3+1)th PLMN-ID field are used to transmit the MF-ID (it is assumed that the length of the MF-ID is 22-bits).

The (n3+2)th to (m3)th PLMN-ID fields are used to indicate multiple short-format PSP-IDs (it is assumed that the length of the short-format PSP-ID is 24-bits) in the NH mode.

The network mode selected by the UE can be reported as follows.

When the UE selects the EPC-connected mode, the UE can report the number corresponding to the selected conventional PLMN-ID when reporting the selected-PLMN.

When the UE selects the NH mode, the UE can report the number corresponding to the MF-ID or the number corresponding to the MF-ID or the number corresponding to the selected PSP-ID when reporting the selected-PLMN.

When the network mode and the related ID are indicated by the eSIB, the SIBx or the like, the PLMN-ID and/or the network mode indication field/MF-ID/PSP-ID can be indicated by defining a new field. The method is as the above method for indicating by the PLMN-ID List in the SIB1.

Preferably, the method further comprises: indicating the system information blocks of different network modes by physical layer parameters.

In the present embodiment, the system information blocks of different network modes can be indicated by the physical layer parameters. The method comprises: 1. for sending the system information blocks indicating different network modes, the CRC of the corresponding PDCCH can be scrambled by different RNTIs. For example, the system information block in the EPC link mode can be scrambled by using an existing SI-RNTI. The system information block in the NH mode can be scrambled by a newly defined NHSI-RNTI. The method further comprises: 2. a dedicated field is added to the DCI transmitted on the PDCCH indicating the system information block (transmitted through the PDSCH) to indicate the network mode corresponding to the system information block. For example, the network mode is indicated by 1 bit, 0 is the NH mode, and 1 is the EPC connected mode.

Preferably, the method further comprises: assigning a preset bit as an indicator indicating the MF-ID of the NH mode, to support the use of the MF-IDs of different lengths of the NH mode in different scenarios.

In the present embodiment, the MF-ID transmitted in the NH mode further comprises a globally unique MF-ID and a randomly selected MF-ID. The globally unique MF-ID and the randomly selected MF-ID can be distinguished by dividing the length and/or value range of the MF-ID. For example, the globally unique MF-ID occupies X bits, while the randomly selected MF-ID occupies Y bits, wherein X is not equal to Y or X is larger than Y. The globally unique MF-ID and the randomly selected MF-ID are both X bits, but the globally unique MF-ID occupies the values of 0 to $2X-1-1$ while the randomly selected MF-ID occupies the values of $2X-1$ to $2X$. The globally unique MF-ID and the randomly selected MF-ID both have multiple lengths, in the n bits corresponding to each length, the globally unique MF-ID occupies the values of 0 to $2n-1-1$, while the randomly selected MF-ID occupies the values of $2n-1$ to $2n$.

Based on the foregoing respective embodiments, the specific bit can be additionally assigned as the indicator indicating the length of the MF-ID, to support the use of the MF-IDs of different lengths in different scenarios. For example, when the number of the MF networks in a current channel is smaller, the shorter MF-ID can be used to reduce the overhead of the system information block or to transmit more other messages (such as PSP-ID), while when the number of the MF networks in the current channel is larger, the longer MF-ID can be used to reduce the collision probability or avoid the collision. The length of the MF-ID can be determined to be periodically triggered based on the scenario such as a core network or an SON server in the initial deployment. For example, 4-bits can be used to indicate the length of the MF-ID.

Specifically, when 1010 represents that MF-ID is equal to 0.5*PLMN-ID, the length is equal to 12 bits.

When 1011 represents MF-ID is equal to PLMN-ID, the length is equal to 24 bits.

When 1100 represents MF-ID is equal to 1.5*PLMN-ID, the length is equal to 36 bits.

When 1101 represents MF-ID is equal to 2*PLMN-ID, the length is equal to 48 bits.

When 1110 represents MF-ID is equal to 2.5*PLMN-ID, the length is equal to 60 bits.

When 1111 represents MF-ID is equal to 3*PLMN1-ID, the length is equal to 72 bits.

A preferred method can set the globally unique MF-ID to correspond to 72 bits (no collision), and the randomly selected MF-ID to correspond to other lengths. The MF network can select the MF-IDs of different lengths to reduce the collision probability and even avoid the collision of the MF-ID according to the index for measuring the number of networks. The index for measuring the number of the networks can be obtained by a network device of the MF network through channel detection, or indicated by the central node network device such as an SON server.

The remaining bits are used to indicate the short-format PSP-ID (it is assumed that the length of the short-format PSP-ID is fixed or well-configured by RRC). For example, the PSP-ID is 12-bits or 24-bits.

As another example, 2-bits are used to indicate the length of the MF-ID, and 2-bits are used to indicate the length of the short-format PSP-ID respectively: 00:12-bits; 01:24-bits; 10:36-bits; and 11:48-bits.

For the PSP-ID, due to the shorter short-format PSP-ID, the simultaneous transmission of more short-format PSP-IDs can be supported.

Figure 5:
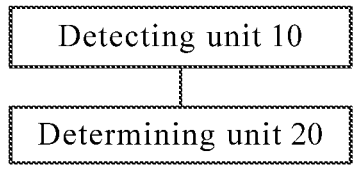
FIG. 5 is a schematic view of a device for indicating a network mode according to an embodiment of the present disclosure.

According to another aspect of the present disclosure, there is further provided a device for indicating a network mode, which can be used to perform the method for indicating a network mode according to the embodiment of the present disclosure. Specifically, as shown in FIG. 5, the device comprises: a detecting unit 10 and a determining unit 20.

The detecting unit 10 is configured to detect the format of the value of the PLMN-ID in the system information block.

The determining unit 20 is configured to: when the value of the PLMN-ID is a value indicated according to the first preset format, determine the information for indicating that the network mode is the NH mode. The first preset format is a format different from a second preset format. The second preset format is a format of the PLMN-ID in the EPC connected mode. The number of bits occupied by the value indicated according to the second preset format is the same as the number of bits occupied by the value indicated according to the first preset format.

After detecting the format of the value of the PLMN-ID in the system information block, the method further comprises: when the value of the PLMN-ID is a value indicated according to the second preset format, determining the indicated value as information for indicating that the network mode is the EPC connected mode.

In the embodiment of the present disclosure, the network mode is determined by detecting whether the value of the PLMN-ID is the value of the conventional PLMN-ID. That is, whether the value of the PLMN-ID is indicated according to the first preset format or indicated according to the second preset format is detected. The second preset format is the value of the conventional PLMN-ID, and the first preset format is the value of the unconventional PLMN-ID.

Specifically, the network mode is determined according to whether the value of the PLMN-ID in the system information block is the value of the conventional PLMN-ID. That is, when the value of the PLMN-ID is the conventional PLMN-ID, the network mode is the EPC connected mode. When the value of the PLMN-ID is the unconventional PLMN-ID, the network mode is the NH mode.

According to the embodiment of the present disclosure, under the premise of ensuring the same size of the system information block, the method for indicating a network mode by using the PLMN-ID can support ID types corresponding to two different network modes, thereby reducing the standard complexity. The technical problem of the increase in protocol complexity caused by different message formats since the EPC connected network mode and the NH network mode use the IDs of completely different types and numbers can be solved.

The embodiment further provides a non-transient computer readable storage medium. The non-transient computer readable storage medium stores a computer instruction that is configured to enable a computer to execute the method provided by any method embodiment of the present disclosure.

The embodiment of the present disclosure further provides a computer program product. The computer program product comprises a computer program that is stored on a non-transient computer readable storage medium. The computer program comprises a program instruction. When the program instruction is executed by a computer, the computer can execute the method provided by any method embodiment of the present disclosure.

Figure 6:
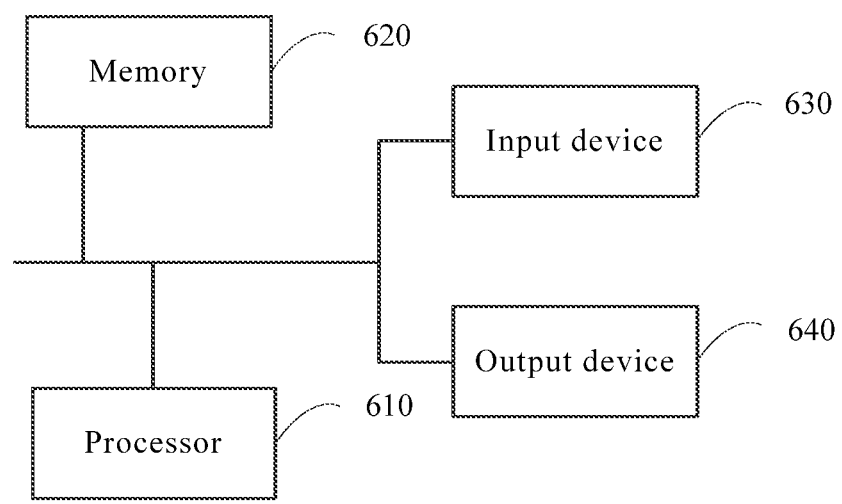
FIG. 6 is a schematic view of a hardware structure of an electronic device that performs the method for indicating a network mode according to an embodiment of the present disclosure.

FIG. 6 is a schematic view of a hardware structure of an electronic device that performs the method for indicating a network mode provided by the embodiment. As shown in FIG. 6, the electronic device comprises one or more processors 610 and a memory 620. FIG. 6 illustrates one processor 610 as an example.

The electronic device can further comprise an input device 630 and an output device 640.

The processor 610, the memory 620, the input device 630 and the output device 640 can be connected through a bus or by other means. FIG. 6 illustrates a connection by means of the bus as an example.

As a non-transient computer readable storage medium, the memory 620 can be configured to store a non-transient software program, a non-transient computer executable program and a module, for example, a program instruction/module (for example, the detecting unit 10 and the determining unit 20 as shown in FIG. 5) corresponding to the method for indicating a network method in the embodiment of the present disclosure. The processor 610 executes various functional applications and data processing of a server through running of the non-transient software program, instruction and module stored in the memory 620. In this way, the method for indicating a network mode in the above embodiment can be executed.

The memory 620 can comprise a program memory area and a data memory area. The program memory area can store an operating system and an application program required by at least one function. The data memory area can store data that are built in accordance with application of the device for indicating a network mode, etc. Moreover, the memory 620 can comprise a high-speed random access memory, and can further comprise a non-transient memory, such as at least one disk memory, a flash memory or other non-transient solid-state memories. In some embodiments, the memory 620 can comprise memories which are remotely disposed relative to the processor 610. These remote memories can be connected to the device for indicating a network mode through networks which comprise but not limited to Internet, Intranet, local area network, mobile radio communications and a combination thereof.

The input device 630 can receive input digital or character information and generate key signal inputs relevant to UE settings and functional control of the transmission processing device. The output device 640 can comprise such display equipment as a display screen.

The one or more modules are stored in the memory 620. When the modules are executed by one or more processors 60, the method for indicating a network mode in any above method embodiment is executed.

The electronic device can execute the method provided by the embodiment of the present disclosure and have corresponding functional modules and beneficial effects for executing the method. The technical details not described in the present embodiment refer to the method provided by the embodiment of the present disclosure.

The electronic device provided by the embodiment of the present disclosure can be embodied in various forms, including but not limited to the followings.

(1) Mobile communication equipment: those having the feature of a mobile communication function and the main objective of providing voice and data communication, and including a smart phone (e.g., iPhone), a multimedia mobile phone, a functional mobile phone, a low-end mobile phone, etc.

(2) Ultra-mobile personal computer equipment: those belonging to personal computers, having computing and processing functions, generally having a mobile Internet access feature and including PDAs, MIDs, UMPCs, etc., for example, iPads.

(3) Portable recreation equipment: those being capable of displaying and broadcasting multimedia contents and including audio and video players (e.g., iPads), a hand-held game player, an e-book, intelligent toys and portable vehicle-mounted navigation equipment.

(4) Servers: those providing computing service and including a processor, a hard disk, an internal memory, a system bus, etc., having a similar architecture to a universal computer and placing higher demands on the processing capability, the stability, the reliability, the security, the expandability, the manageability, etc., due to the need for providing high-reliability services.

(5) Other electronic devices with data interaction functions.

The serial numbers of the embodiments of the present disclosure are merely for description, and do not represent the advantages and disadvantages of the embodiments.

In the above-mentioned embodiments of the present disclosure, the descriptions of the embodiments have their respective emphases. For the parts that are not detailed in a certain embodiment, refer to the related descriptions of other embodiments.

It should be understood that in the embodiments provided by the present disclosure, the disclosed technical contents can be achieved by other means. The device embodiments described above are merely schematic. For example, the partitioning of the units can be a logical functional partitioning. There may be other partitioning modes during actual implementation. For example, multiple units or components can be combined or integrated into another system, or some features can be ignored or not executed. In addition, mutual coupling or direct coupling or communication connection that is shown or discussed can be indirect coupling or communication connection through some interfaces, units or modules, and can be in electrical or other forms.

The units described as separate components may or may not be physically separated, and the components for unit display may or may not be physical units, that is, may be located in one place or distributed on a plurality of units. Part or all of the units can be selected according to actual needs to achieve the objective of the solutions of the embodiments.

In addition, all functional units in the embodiments of the present disclosure can be integrated into one processing unit. Or, each unit exists physically independently. Or, two or more units can be integrated into one unit. The above integrated units can be embodied in the form of hardware or a software functional unit.

The integrated units, if embodied in the form of the software functional unit and sold or used as a standalone product, can be stored in a computer readable storage medium. Based on such understanding, the technical solution of the present disclosure in essence, or a part that contributes to the related art, or all or part of the technical solution, can be embodied in the form of a software product. The computer software product is stored in a storage medium and comprises a plurality of instructions for a computer device (which can be a personal computer, a server, a network device or the like) to perform all or part of the steps of the method described in the embodiments of the present disclosure. The foregoing storage medium comprises: a USB flash disk, a Read-Only Memory (ROM), a Random Access Memory (RAM), a removable hard disk, a magnetic disk, an optical disk, or other various media that can store program codes.

The above description merely describes preferable implementations of the present disclosure, and it should be noted that those skilled in the art can also make various improvements and modifications without departing from the principle of the present disclosure. These improvements and modifications should be considered to be within the scope of protection of the present disclosure.

What is claimed is:

1. A method for indicating a network mode, comprising:
   detecting a format of a value of a Public Land Mobile Network IDentity (PLMN-ID) in a system information block; and
   determining, when the value of the PLMN-ID is a value indicated according to a first preset format, the indicated value as information indicating that the network mode is a Neutral Host (NH) mode, wherein the first preset format is a format different from a second preset format which is a format of the PLMN-ID in an Evolved Packet Core (EPC) connected mode;
   wherein the method further comprises, after detecting the format of the value of the PLMN-ID in the system information block:
   determining, when the value of the PLMN-ID is a value indicated according to the second preset format, the indicated value as information indicating that the network mode is the EPC connected mode.

2. The method according to claim 1, wherein
   when the network mode indicated in the system information block is one network mode:
   when the indicated value is determined as the information indicating that the network mode is the EPC connected mode, a field corresponding to the PLMN-ID is indicated according to the second preset format, wherein in the second preset format, the PLMN-ID comprises a field representing a Mobile Country Code (MCC) followed by a field representing a Mobile Network Code (MNC).

3. The method according to claim 1, wherein
   when the network mode indicated in the system information block is one network mode:
   when the indicated value is determined as the information indicating that the network mode is the NH mode, a field corresponding to the PLMN-ID is indicated according to the first preset format, wherein in the first preset format, the PLMN-ID comprises sequentially a field representing a network unified identity of the NH mode, a field representing a network identity of the NH mode, and a field representing a service provider identity.

4. The method according to claim 1, wherein
   when the network mode indicated in the system information block comprises two network modes:
   a part of fields in a PLMN-ID List is used to indicate an identity in the EPC connected mode, and the remaining fields are used to indicate the identity in the NH mode, with a preset delimiting ID therebetween as a delimiter.

5. The method according to claim 1, wherein one or more unused values of the PLMN-ID from a range of values indicated according to the second preset format are assigned as a value of a network unified identity of the NH mode.

6. The method according to claim 1, wherein one or more values outside a range of values indicated according to the second preset format are selected as a value of a network unified identity of the NH mode.

7. The method according to claim 1, wherein
   when the network mode indicated in the system information block is one network mode:
   a first PLMN-ID field of the PLMN-ID List in the system information block is used to indicate the network mode, wherein when the first PLMN-ID field is a value indicated according to the second preset format, the indicated value is determined as the information indicating that the network mode is the EPC connected mode.

8. The method according to claim 7, wherein
   when the network mode indicated in the system information block is one network mode:
   when the first PLMN-ID field is a value of a network unified identity of the NH mode, the value is determined as the information indicating that the network mode is the NH mode.

9. An electronic device, comprising at least one processor and a memory communicatively connected with the at least one processor, wherein
   the memory stores instructions executable by the at least one processor and configured to perform the method according to claim 1.

10. A device for indicating a network mode, comprising at least one processor and a memory communicatively connected with the at least one processor, wherein the memory stores instructions executable by the at least one processor and configured to:
- detect a format of a value of a Public Land Mobile Network Identity (PLMN-ID) in a system information block; and
- determine when the value of the PLMN-ID is a value indicated according to a first preset format, the indicated value as information indicating that the network mode is a Neutral Host (NH) mode, wherein the first preset format is a format different from a second preset format which is a format of the PLMN-ID in an Evolved Packet Core (EPC) connected mode,
- wherein the instructions are further configured to, after detecting the format of the value of the PLMN-ID in the system information block:
- determine, when the value of the PLMN-ID is a value indicated according to the second preset format, the indicated value as information indicating that the network mode is the EPC connected mode.

* * * * *